United States Patent Office 3,578,729
Patented May 11, 1971

3,578,729
THERMOPLASTIC POLYESTER MOLDING
COMPOSITIONS
Ludwig Brinkmann and Walter Herwig, Frankfurt am Main, and Harald Cherdron, Wiesbaden, Germany, assignors to Farbwerke Hoechst Aktiengesellschaft vormals Meister Lucius & Bruning, Frankfurt am Main, Germany
No Drawing. Filed July 11, 1968, Ser. No. 743,925
Claims priority, application Germany, July 20, 1967,
F 53,013
Int. Cl. C08g 39/10
U.S. Cl. 260—873
15 Claims

ABSTRACT OF THE DISCLOSURE

Molding compositions which can be processed thermoplastically are prepared from a mixture of linear saturated polyesters and $\alpha$-olefin-acrylic acid ester copolymers and are distinguished by a high impact strength.

The present invention relates to thermoplastic polyester molding compositions.

It is known that the polyester molding compositions containing linear saturated polyesters of aromatic dicarboxylic acids can be processed into crystalline shaped articles. Polyethylene terephthalate, for example, can be injection molded to yield shaped articles the speed of crystallisation and degree of crystallinity of which can be influenced by the addition of suitable nucleating agents. The shaped articles thus obtained only possess moderate impact strength.

It is furthermore known that polypropylene or poly-4-methylpentene-1 can be admixed to polyesters. Molding compositions of improved dimensional stability are obtained.

It has now been found that thermoplastic molding compositions can be prepared which comprise a mixture of (a) Linear saturated polyesters of aromatic dicarboxylic acids with saturated aliphatic or cycloaliphatic diols and (b) From 0.1 to 25% based on the total weight of the mixture of copolymers of ethylene with esters of acrylic, methacrylic or ethacrylic acid and saturated aliphatic alcohols.

Preferably the copolymer of ethylene with the acrylic or alkacrylic ester comprises from 0.5 to 10% by weight of the total mixture.

The linear polyesters of aromatic dicarboxylic acids with saturated aliphatic or cycloaliphatic diols may contain a small proportion of units derived from another aromatic or an aliphatic dicarboxylic acid or from another saturated aliphatic or cycloaliphatic diol. The surprising feature in this is that the impact strength of the polyesters modified in this way is increased without the hardness, abrasion resistance and solvent resistance being unfavourably affected.

It is possible to add to the molding compositions of the present invention, nucleating agents which increase the speed of crystallization of the polyester composition and to result in the polyester shaped articles reaching a good degree of crystallinity. Shaped articles of good degree of crystallinity are also dimensionally stable above the second-order transition temperature and do not shrink. Finely divided inorganic substances which are insoluble in the polyester molding compositions, for example calcium carbonate, aluminium silicate and talc, may be used as nucleating agents. The addition of the nucleating agent may be effected at various points of the process of manufacture of the polyester molding compositions. Thus the nucleating agent may be added during the manufacture of the starting polyester, in the course of the polycondensation. It is also possible to admix the nucleating agent to the polyester together with the copolymer. Furthermore, the granulated polyester molding composition can be treated with a nucleating agent in a rotating vessel and, optionally, fused in an extruder, extruded under pressure and again granulated.

It has been found, surprisingly, that the molding compositions according to the invention can also be processed into shaped articles of good dimensional stability without nucleating agents. The shaped articles are also dimensionally stable at temperatures above their second-order transition temperatures.

Polyethylene glycol terephthalate is preferably used as the linear saturated polyester of aromatic dicarboxylic acids. It is also possible to use other polyesters, for example, polycyclohexane-1,4-dimethylol-terephthalate. It is also possible to use modified polyethylene terephthalates which in addition to terephthalic acid contain further aromatic or also aliphatic dicarboxylic acid as basic units, for example naphthalene-2,6-dicarboxylic acid or adipic acid. Furthermore, it is possible to employ modified polyethylene terephthalates which in addition to ethylene glycol also contain other aliphatic diols, for example, neopentyl glycol or butanediol-1,4, as alcoholic components.

The polyesters preferably have a reduced specific viscosity dl./g. (measured in a 1% strength solution in phenol/tetrachlorethane, 60:40 by weight, at 25° C.) of between 0.6 and 2.0, advantageously between 0.9–1.6.

It is also possible to start from polyesters of lower reduced specific viscosity and to bring about the desired higher viscosity by post-condensation during the mixing process.

Numerous copolymers may be used as copolymers of ethylene with acrylic, methacrylic or ethacrylic acid esters of saturated aliphatic alcohols. Preferably, compounds are used which correspond to the following general formula:

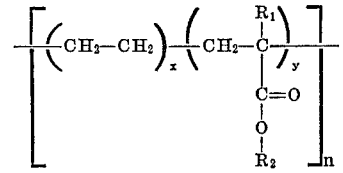

in which $x$, $y$ and $n$ are integers, $R_1$ represents a hydrogen atom, a methyl radical or an ethyl radical and $R_2$ represents an alkyl radical having from 1 to 12 carbon atoms.

The polyester molding compositions according to the invention contain from 0.1 to 25% by weight, preferably from 0.5 to 10% by weight, of the copolymers of ethylene with acrylic or alkacrylic esters.

The copolymers of ethylene and esters of acrylic or methacrylic acid and methanol or ethanol advantageously have an ethylene content in the range of from 30 to 99, preferably of from 50 to 75% by weight. They advantageously have a mean molecular weight M.W. in the range of from 2000 to 1,000,000, preferably of from 20,000 to 25,000. Products with M.W. in the range of from 50,000 to 150,000 prove especially advantageous.

The admixture of the $\alpha$-olefin-acrylic acid ester copolymer, hereinafter called simply the copolymer, to the polyester composition may, for example, be effected in the following ways:

(a) The polyester is fused and, optionally, post-condensed to the desired viscosity in the melt, in vacuo. The copolymer is then added and intensively stirred in, appropriately under nitrogen. The melt is optionally further stirred in vacuo until homogeneous mixing has taken place.

(b) The polyester in the form of granules or powder is mixed with the copolymer as uniformly as possible, the resulting mixture being fused in an extruder, extruded whilst cooling and granulated.

(c) The polyester granules are tumbled in a rotating vessel with the fused copolymer at an elevated temperature and allowed to cool whilst continuing tumbling. The mixing is effected by the screw of an injection molding machine when processing the polyester molding compositions into shaped articles.

(d) The polyester is fused together with the copolymer appropriately under nitrogen. After fusing the mixture is stirred intensively, optionally in vacuo.

(e) The polyester granules are tumbled with a solution of the copolymer, for example in benzene or toluene, in a rotating vessel. The solvent is evaporated off whilst tumbling, and the polyester granules are in the course of this coated with a film of the copolymer. Mixing is effected by the screw of the injection molding machine when processing the polyester molding composition into shaped articles.

Admixture is preferably effected as in (a) or (b).

The polyester molding composition should contain as little moisture as possible, preferably less than 0.01% by weight.

In order to keep the moisture uptake low, the granulated polyester molding composition may be provided with a coating of an inert hydrophobic substance, for example, paraffin or wax.

The polymer mixtures according to the invention may be thermoplastically processed into dimensionally stable shaped articles which are distinguished by increased impact strength.

In order to obtain crystalline, or partially crystalline, shaped articles the mold temperature must be sufficiently above the second order transition temperature of the polyester material employed. The shaped articles obtained from the polyester molding compositions manufactured in accordance with the invention are distinguished by particularly high impact strength and flexural strength whilst having good surface hardness, good solvent resistance and low moisture uptake.

The following examples illustrate the invention, but they are not intended to limit it thereto, parts and percentages being by weight.

EXAMPLE 1

3.40 kg. of polyethylene terephthalate (reduced specific viscosity 0.85 dl./g., measured at 25° C. in a 1% strength solution in phenol/tetrachlorethane, 60:40) were stirred for 1 hour at 80° C. and at a pressure of 0.2 mm. Hg. The melt was covered with dry nitrogen. 105 g. of a copolymer of ethylene and acrylic acid butyl ester having an ethylene proportion of 65% by weight, and a mean molecular weight, M.w., of 150,000, were then added to the polyester melt. The mixture was stirred for 15 minutes at 280° C. and at a pressure of 0.1 mm. Hg.

3.0 kg. of the granulated polyester molding composition were rolled for 1 hour at 100° C. and at a pressure of 0.4 mm. Hg, then for 30 minutes at 150° C. and 0.4 mm. Hg and finally for 5 hours at 240° C. and 0.4 mm. Hg. The product was allowed to cool under nitrogen. It was then tumbled for 2 hours under nitrogen with 6.0 g. of aluminium silicate powder (47% $SiO_2$, 38% $Al_2O_3$) (75% of the particles had a diameter of less than $2\mu$), and thereafter tumbled for 3 hours at 90° C. with 12.0 g. of paraffin (drop point 56° C.). Sheets of dimensions 60 x 60 x 1 mm. having good dimensional stability were injection molded from the material at a mold temperature of 150° C. The impact strength of the sheets was tested by a drop test in which the test sheets were exposed to an impact stress by allowing a falling body sliding on low-friction tracks to drop vertically from different heights onto the sheets clamped on a frame. The tip of the falling hammer represented a hemisphere of a radius 10 mm. 10 sheets were tested for each height.

Microtome sections were produced from the molding composition and these were extracted for several hours with boiling toluene in a Soxhlet. No copolymer was found in the extract.

In a comparison experiment polyethylene terephthalate was treated as described above, but with the difference that no copolymer of ethylene and acrylic acid ethyl ester was added. The results of the drop test are summarised in Table 1.

EXAMPLE 2

3.465 kg. of polyethylene terephthalate (reduced specific viscosity 0.85 dl./g., measured at 25° in a 1% strength solution in phenol/tetrachlorethane, 60:40) were mixed in the melt, as described in Example 1, with 35 g. of a copolymer of ethylene and acrylic acid ethyl ester, mean molecular weight M.w.=1,000,000 and with a proportion of ethylene of 65% by weight. The granulated product was tumbled with aluminium silicate powder and paraffin, as described in Example 1, and injection molded into sheets. The results of the drop test are reproduced in Table 1.

EXAMPLE 3

2 kg. of polyethylene terephthalate powder (reduced specific viscosity 1.43 dl./g. measured at 25° C. in a 1% strength solution in phenol/tetrachlorethane, 60:40) having a particle size distribution in the range of from 100 to 750$\mu$, were mixed with 50 g. of a copolymer of 65 parts of ethylene and 35 parts of acrylic acid ethyl ester of mean molecular weight, M.w., 100,000, homogenized in an extruder and subsequently granulated. Further processing and testing was carried out as described in Example 1. Drop test, Table 1.

EXAMPLE 4

The procedure of Example 3 was followed but 40 g. of a copolymer of 60 parts of ethylene and 40 parts of acrylic acid ethyl ester, of mean molecular weght, M.w., 100,000, were employed.

TABLE 1

| Polyester | Copolymer admixed | Amount added, percent by weight | Drop height, F 20 [1] |
|---|---|---|---|
| Polyethylene terephthalate. | Ethylene-acrylic acid butyl ester as in Example 1. | 3 | 135 |
| Polyethylene terephthalate (Example 1). | Comparison | | 50 |
| Polyethylene terephthalate. | Ethylene-acrylic acid ethyl ester as in Example 2. | 1 | 115 |
| Do | Ethylene-acrylic acid ethyl ester as in Example 3. | 2.5 | 125 |
| Do | Ethylene-acrylic acid ethyl ester as in Example 4. | 2.0 | 110 |

[1] Height at which the impact energy suffices to produce fracture in 20% of the sheets.

We claim:
1. Thermoplastic molding compositions consisting essentially of a mixture of (a) linear saturated polyesters consisting essentially of terephthalic acid esters of diols selected from saturated aliphatic diols and cyclohexane 1,4-dimethylol, said polyesters having a reduced specific viscosity of 0.6 to 2.0 as measured at a 1% concentration in a 60:40 mixture of phenol and tetrachlorethane at 25° C. and (b) from 0.1 to 25% by weight, based on the total weight of mixture, of copolymers of ethylene and esters of acrylic acid, methacrylic acid or ethacrylic acid with saturated aliphatic alcohols of 1 to 12 carbon atoms, said copolymers having a mean molecular weight of 2,000 to 1,000,000 and an ethylene content of 30% to 99% by weight.

2. Thermoplastic molding compositions as claimed in claim 1, which contain as linear saturated polyesters polyethyleneglycol terephthalate.

3. Thermoplastic molding compositions as claimed in claim 1, which contain as linear saturated polyesters polycyclohexane-1,4-dimethylol-terephthalate.

4. Thermoplastic molding compositions as claimed in claim 1, wherein the polyester contains, in addition to terephthalic acid, other aromatic or aliphatic dicarboxylic acids.

5. Thermoplastic molding compositions as claimed in claim 1, wherein the polyester has a reduced specific viscosity dl./g., measured in a 1%-solution of phenol/tetrachlorethane of 60:40 at 25° C., in the range of from 0.6 to 2.0.

6. Thermoplastic molding compositions as claimed in claim 1, wherein the copolymer comprising ethylene and esters of acrylic acid, methacrylic acid or ethacrylic acid with saturated aliphatic alcohols is added to the polyester in an amount ranging from 0.5 to 10% by weight.

7. Thermoplastic molding compositions as claimed in claim 1, wherein the copolymer contains acrylic acid-, methacrylic acid- or ethacrylic acid esters in which methanol or ethanol is used as alcoholic component.

8. Thermoplastic molding compositions as claimed in claim 1, wherein the copolymer contains ethylene in an amount ranging from 30 to 99% by weight.

9. Thermoplastic molding compositions as claimed in claim 1, wherein the copolymer contains ethylene in an amount ranging from 50 to 75% by weight.

10. Thermoplastic molding compositions as claimed in claim 1, wherein the copolymer has a mean molecular weight in the range of from 2,000 to 1,000,000.

11. Thermoplastic molding compositions as claimed in claim 1, wherein the copolymer has a mean molecular weight in the range of from 20,000 to 250,000.

12. Thermoplastic molding compositions as claimed in claim 1, wherein the copolymer has a mean molecular weight in the range of from 50,000 and 150,000.

13. Thermoplastic molding compositions consisting essentially of a mixture of (a) linear saturated polyesters consisting essentially of terephthalic acid esters of diols selected from saturated aliphatic diols and cyclohexane 1,4-dimethylol, said polyesters having a reduced specific viscosity of 0.6 to 2.0 as measured at a 1% concentration in a 60:40 mixture of phenol and tetrachloroethane at 25° C. and (b) from 0.1 to 25% by weight, based on the total weight of the mixture, of a copolymer of the general formula

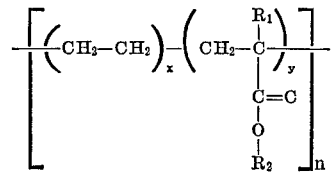

in which $x$, $y$ and $n$ are integers, $R_1$ is hydrogen, methyl or ethyl and $R_2$ is an alkyl radical of 1 to 12 carbon atoms, the mean molecular weight of said copolymer being in the range 2,000 to 1,000,000, and the ethylene content of said copolymer being 30% to 99% by weight.

14. A molding composition according to claim 13 wherein said copolymer is a copolymer of ethylene and butyl acrylate.

15. A molding composition according to claim 13 wherein said copolymer is a copolymer of ethylene and ethyl acrylate.

References Cited
UNITED STATES PATENTS 3,249,570  6/1966  Potts et al. _____ 260—29.6
3,290,411  12/1966  Tsuji et al. _____ 260—873

OTHER REFERENCES

Krevsky et al., Plastics Technol. 9(5), 34–37 (1963).

WILLIAM H. SHORT, Primary Examiner

M. GOLDSTEIN, Assistant Examiner

U.S. Cl. X.R.

117—100, 138.8; 260—28.5